United States Patent
Cole

[15] 3,659,462
[45] May 2, 1972

[54] ARRESTING DEVICE FOR HEAVY OBJECTS THROWN WITH GREAT FORCE

[72] Inventor: Clyde C. Cole, 5298 Harvard, Ventura, Calif. 93003

[22] Filed: Feb. 4, 1970

[21] Appl. No.: 8,567

[52] U.S. Cl............................................73/432, 182/137
[51] Int. Cl.....................................................G01m 19/00
[58] Field of Search..............73/432 R, 167, 11, 12; 5/348; 182/137

[56] References Cited

UNITED STATES PATENTS

| | | | |
|---|---|---|---|
| 1,166,811 | 1/1916 | Bowers | 182/137 |
| 3,513,491 | 5/1970 | Gordon | 182/137 X |
| 396,242 | 1/1889 | Simon | 182/137 |
| 958,383 | 5/1910 | Fischer | 182/137 |
| 3,399,407 | 9/1968 | Olsen | 5/348 |
| 2,636,384 | 4/1953 | Holloway | 73/167 |

*Primary Examiner*—S. Clement Swisher
*Attorney*—Richard S. Sciascia and Q. Baxter Warner

[57] ABSTRACT

An energy absorbing arresting device for thrown objects of substantial weight, said device employing an assembly of spaced formed pads of deformable cushion material into which the object is forcefully ejected. Control of trapped air flow from and return of such air to the assembly, aids in preventing destructive rebound of the thrown object. In a mobile embodiment it includes a spring supported platform mounted on a vehicle whereby the entire device may be transported from place to place.

2 Claims, 4 Drawing Figures

PATENTED MAY 2 1972
3,659,462
SHEET 1 OF 2
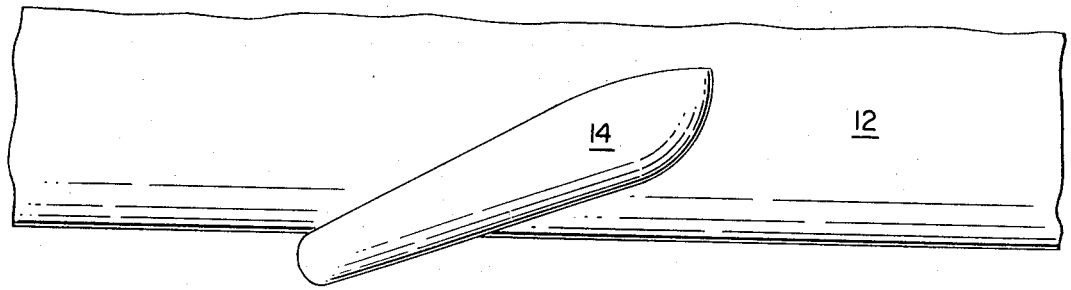
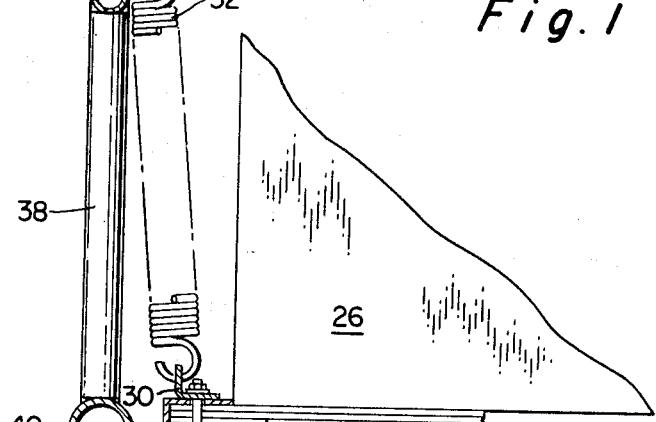
Fig.1
Fig.2
INVENTOR
CLYDE C. COLE
BY
*R. Baxter Warner*
ATTORNEY

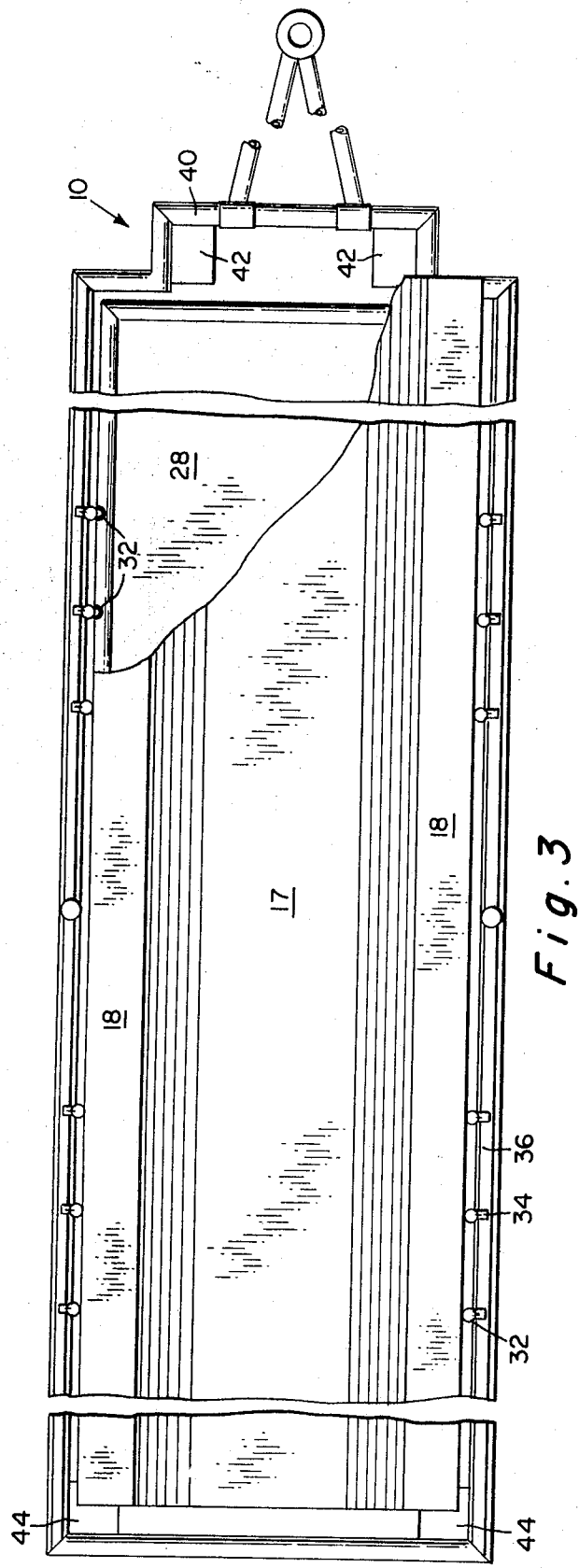
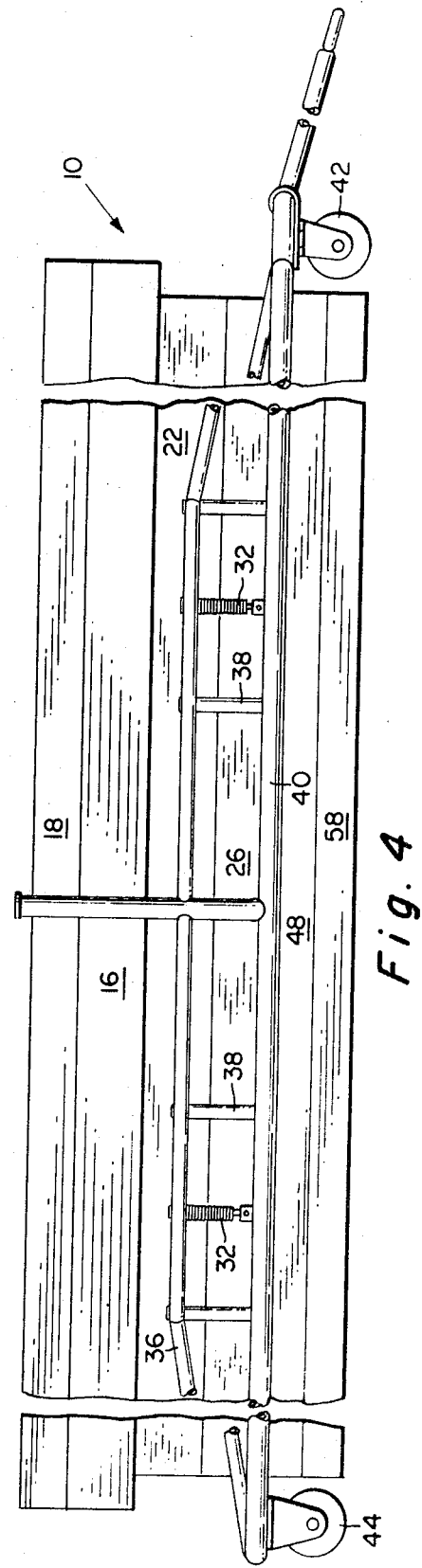

ARRESTING DEVICE FOR HEAVY OBJECTS THROWN WITH GREAT FORCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of Invention.

This invention relates to motion arresting devices, and particularly devices designed to catch and support an object freely thrown thereinto without subjecting said object to a destructive rebound.

The present invention is particularly directed to providing a safe, inexpensive, easily transported means of arresting missiles ejected from the under surface of an aircraft wing during functional checks of the aircraft's missile launching system.

2. Description of the Prior Art.

Heretofore it has been the practice in testing the functioning of aircraft missile launching systems, wherein the missile is forcefully propelled downwardly during launch, to construct a large concrete test pit over which the plane could be spotted. This pit was filled with straw and an aircraft containing a launcher to be tested was towed to the facility, carefully positioned with the launcher over the test pit, and thereafter the missile was forcefully ejected into the pit. Thereafter the aircraft was pulled clear of the pit and the test missile was retrieved from its burial point in the straw. This system had obvious disadvantages since such pits are expensive to construct, transport of the plane to the test area was required, and such a pit could not readily be provided aboard aircraft carriers. Furthermore, it required the use of numerous personnel — weapon handlers, missile retrievers, etc.

SUMMARY OF THE INVENTION

The present invention contemplates a missile receiving trough of appropriate size formed of a deformable plastic material so arranged as to utilize the resistance occasioned by the delayed egress of trapped air to retard deformation of the trough and correspondingly retard rebound of the trough material and hence the missile or other object caught thereby.

In one embodiment this trough is carried upon a spring supported platform which will yield when a blow is received by the impact receiving trough. A curtain of sheet material, such as fabric, may be disposed around the periphery of the spring supported platform, between it and the floor, and in use it permits egress of air trapped during forceful downward movement of the platform, but serves to impede the return of air into the evacuated space under the platform, thus aiding in restraining rebound of the platform and the object ejected into the trough supported thereby.

In order to provide mobility the entire assembly is supported on a framework provided with wheels and a steering arrangement. This allows travel from plane to plane or to other areas where a missile launcher or similar device is to be tested. Thus the object catching device is brought to the device being tested rather than the reverse.

STATEMENT OF THE OBJECTS OF THE INVENTION

It is an object of the present invention to provide means for arresting the movement of an object and dissipating the kinetic energy thereof.

A further object is to provide a means for arresting a moving article of substantial mass and dissipating the impact energy thereof without rebound damage to said article or to the adjacent structure.

Another object is to cushion the impact of a thrown article and dissipate its kinetic energy without returning such energy to the article.

Another object is to provide such a device in the form of a vehicle of low silhouette which may readily be moved under a low clearance overhanging support and will yieldingly receive an object expelled from such support without rebound.

A further object is to provide an article catching and transporting cart.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a perspective view of a missile receiving and transporting cart embodying the principles of the present invention.

FIG. 2 is an enlarged detail cross-sectional view of a portion of the spring supported platform arrangement incorporated in the embodiment of FIG. 1 and taken along a line substantially corresponding to line 2—2 of FIG. 1.

FIG. 3 is a top plan view with a portion broken away of the embodiment of FIG. 1 showing the manner in which the object receiving pad is supported within a circumjacent framework.

FIG. 4 is a side elevational view of the embodiment illustrated in FIGS. 1 and 3.

DESCRIPTION OF THE PREFERRED EMBODIMENTS

Referring now to the drawings in detail, there is shown in FIG. 1 a cart indicated generally by the reference character 10 shown positioned below the wing 12 of an aircraft and aligned with an elongate missile body 14 supported by a launcher located on the under surface of said wing. Ordinarily, for purposes of missile launch during aircraft flight, such missiles are retained in place by securement to a launching rack which includes powerful missile projecting means adapted to throw the missile downwardly with great force so as to propel it away from the undersurface of the aircraft to a point well clear of the aircraft before missile propulsion is initiated. Such downward propelling arrangement is actuated whenever the missile ejecting system is undergoing test and whenever a missile is removed from the launching rack. Hence the aforementioned system of locating the plane wing over a straw filled pit has been necessary when the missile is to be removed on the ground without damage to the missile or the surrounding equipment.

The elongate cart 10 supports rectangular cushion member 16 of substantial thickness. Along the upper surface of such cushion 16 are provided two spaced ridges or side barriers 18 of similar material which define a trough 17 therebetween and help prevent lateral escape of a received object. When an elongate object such as the missile 14 is forcefully propelled downwardly into the trough 17 the latter is downwardly depressed and deformed along its central portion into a tunnel 20 having open ends. This tunnel is defined at the sides by spaced elongate pads 22,24 and at the top and bottom by pads 16,26, all made of a similar cushion material. Pad 26 underlies the whole structure and its bottom surface rests upon the top surface of a platform 28 shown in FIG. 2. This platform may be of plywood or similar sheet material and is preferably of sufficient length and width to provide a flat support surface under the entire bottom of pad 26.

As further shown in FIG. 2 the platform 28 may, by the use of clips 30, be suspended from tension springs 32 which in turn are secured at their upper ends to clips 34 spaced at intervals along the upper rail 36 of a side rail assembly which includes vertically orientated posts 38 extending upwardly from a pad surrounding lower frame rail 40.

The framework, including peripheral rail 40, is made mobile by steerable front casters 42 and fixed rear casters 44. Through springs 32 it supports platform 28 in such fashion that the latter can readily "give" or yield when excessive downward force is applied thereto. Such downward force occurs when the cushion members 16,22,24 and 26 have been sufficiently compressed to overload the platform in excess of the yield strength of springs 32.

As previously mentioned, sudden movement of pads 16 and 26 closer together forcefully expels the air entrained in tunnel 20 and the air inertia and delay in its return into such channel aids in preventing upward rebound of the load received in trough 17.

Sudden downward movement of platform 28 compresses the air at point 46 under platform 28. This air is enclosed and confined by a circumperipheral curtain 48 suspended around the outer edge of platform 28 where it is secured by suitable means such as bolts 50 and molding strip 52. A series of tacks 54 or similar fastening means may also be employed to assist in holding this fabric in place.

The lower edge of the fabric curtain is weighted and reinforced by a cable member 56 received in the fold of a wide hem 58. Thus normally the lower edge of the curtain rests upon or lies closely adjacent to the floor surface upon which the vehicle rests.

It will be apparent that rapid downward movement of platform 28 by displacing the air beneath the vehicle flares this curtain 48 outwardly. This also lifts the curtain and there is some escape of displaced air. Of course the ready return of such air is inhibited by the curtain member and consequently there is a delay in the return of the platform 28 upwardly to its normal position. In order to help control the outward flaring movement of the curtain straps 60, 62 may be secured to the lower hem of the curtain at intervals. These extend transversely across the space 46 beneath the platform 28 to the opposite side where they are secured in place. The manner of securement at the far side is illustrated by the fashion in which strap 62 is shown secured in place (FIG. 2).

It will be noted that in operation of the device of this invention downward energy received upon missile impact is initially absorbed by the cushion 16, reinforced by the side barriers or ridges 18, and such movement is converted from vertical vector energy into non-recoverable widely disbursed horizontal vector energy in several ways. One is by the pumping out from tunnel 20 of an air column which must reverse its direction of flow and, because of its inertia, cannot readily return into the tunnel. Another is by curtain 48 which initially yields and permits limited outward flow of air from under platform 28 but thereafter impedes return movement of such air under the platform.

By the aforesaid construction there is provided an extremely simple and effective device for arresting movement of heavy objects and preventing rebound of such objects. The entire arrangement is a buffer arrangement with all parts carefully coordinated in operation. Each part performs an important function, yet there is not required heavy or complex energy absorbing equipment.

Obviously many modifications and variations of the present invention are possible in the light of the above teachings. It is therefore to be understood that within the scope of the appended claims the invention may be practiced otherwise than as specifically described.

I claim:

1. Apparatus for arresting the motion of a massive object incident thereon and for asorbing a major portion of its kinetic energy so as to inhibit a rebound thereof, said apparatus comprising:
   a first pad of deformable resilient material having an upper surface upon which said object is intended to impinge,
   a second pad also of deformable resilient material lying below said first pad and separated therefrom by an air passage leading to at least one opening through which air may be expelled upon a decrease in the distance separating said two pads,
   a platform supporting said second pad, said platform being of relatively inflexible material,
   means for resiliently supporting said platform from a rigid planar base to permit limited movement of said platform in a direction essentially coinciding with that of said object when incident upon said first pad,
   a circumperipheral member carried by said platform and extending to said base so as to form and enclose a volume of air bounded by said circumperipheral member, said platform, and said base,
   that portion of said circumperipheral member adjacent said base being displaceable laterally outwardly and generally parallel to the plane of said base as a result of the impingement of an object upon said first pad, such lateral outward movement of said member being due to the expulsion of a portion of the air in the said volume enclosed by said base, platform and circumperipheral member upon a decrease in the separation distance between said base and platform,
   said circumperipheral member returning to its original position upon cessation of movement of said platform toward said base to inhibit the return inflow of air into the space between said base and platform and hence decelerate the movement of said platform back to its original position under the influence of said resilient supporting means, with a concomitant decrease in the tendency of said object to rebound from the surface of said first pad.

2. A motion-arresting device comprising:
   a body of deformable resilient material having a surface to receive objects incident thereon;
   a platform supporting said body of resilient material, said platform being itself displaceably supported above a rigid planar base,
   means circumperipherally disposed about said platform so as to enclose a given volume of air bounded by said platform, said base and said means,
   said means acting as a one-way valve with respect to the passage of air thereby,
   so that, upon compressive deformation of said body of resilient material and displacement of said platform towards said base so as to reduce the volume of air therebetween, said means acts to freely allow exit of air thereby, and, upon cessation of platform displacement, inhibits the subsequent return of air and hence extends the time required for restoration of said given volume.

* * * * *